United States Patent [19]
Hu

[11] Patent Number: 6,152,539
[45] Date of Patent: Nov. 28, 2000

[54] FIXING DEVICE FOR WHEEL SEATS OF A BABY STROLLER

[76] Inventor: Stephen Hu, NO2, Ta-Tung Road, Hsinchu-Chu Industrial Park, Taiwan

[21] Appl. No.: 09/181,051

[22] Filed: Oct. 27, 1998

[51] Int. Cl.[7] .............................. B60B 23/00; A47B 91/00
[52] U.S. Cl. .............................. 301/111; 301/121; 16/46; 16/47
[58] Field of Search .................................. 301/111 I, 119, 301/120, 121, 122; 16/18 R, 20, 38, 44, 45, 46, 47, 48; 403/109.3, 327, 328

[56] References Cited

U.S. PATENT DOCUMENTS

| | | | |
|---|---|---|---|
| 2,719,688 | 10/1955 | Seifert | 403/328 |
| 4,508,468 | 4/1985 | Irwin | 403/328 |
| 4,897,895 | 2/1990 | Wang | 16/20 |
| 6,024,416 | 2/2000 | Chen et al. | 301/111 |
| 6,042,195 | 3/2000 | Huang | 301/111 |
| 6,048,037 | 4/2000 | Cheng | 301/111 |

*Primary Examiner*—S. Joseph Morano
*Assistant Examiner*—Jason R. Bellinger
*Attorney, Agent, or Firm*—Pro-Techtor International Services

[57] ABSTRACT

A fixing device for wheel seats of a baby stroller engaged and fixed each with/on one of the wheel seats, it has a fixing rod secured on the bottom of a foot. The fixing rod has one of its ends protruded down and out from a pipe mouth of the foot, the end is provided at least with a transverse slot. More than one push buttons are provided respectively in the transverse slots of the fixing rod and are displaceable transversely in the transverse slots. An elastic member is received in receiving holes on the push buttons. When the two push buttons are transversely pushed in the transverse slots, they are endued with elastic restoring function. When the foot with the fixing device thereon is extended in the axle hole of the wheel seat, the push buttons are appropriately pushed outwardly by the elastic member to have the bottom of the wheel seat limited by the push buttons from dropping. Assembling and dismantling of the wheel seats are very convenient.

1 Claim, 5 Drawing Sheets

FIXING DEVICE FOR WHEEL SEATS OF A BABY STROLLER

BACKGROUND OF THE INVENTION

1. Field of the Invention

The present invention is related to a fixing device for wheel seats of a baby stroller. And especially to such fixing devices which each can render one of the wheel seats of the baby stroller to be assembled and disassembled quickly. Therefore the wheel seats can be dismantled from the baby stroller for reducing volume of packing of the baby stroller.

2. Description of the Prior Art

Conventional baby strollers normally are practical in that they are convenient in carrying babies. Manufacturers in the earlier time directly fix the wheel seats of a baby stroller on the feet of the baby stroller, hence the volume in packing the baby stroller is rather large, and this increases cost of shipping. In view of this, the solution taken for a baby stroller nowadays is using a wheel seat in the form of a cap on each foot of the baby stroller. In this way, a manufacturer does not need to assemble wheel seats on a baby stroller to be packaged. And a consumer can place the caps put in the packing box on the feet by himself to thereby fixedly assemble the wheel seats on the baby stroller conveniently. However, if the manufacturer forgot to attach the caps in the packing box when the baby stroller was packaged, the consumer can not assemble the wheel seats in the form of the caps by himself, and thus inconvenience exists.

Another way for a consumer to assemble wheel seats by himself is provided in this mode: a manufacturer provides engaging members directly on the feet of the baby stroller. The elasticity of the engaging members can allow fixing the wheel seats onto the feet of the baby stroller by a user, and thus the trouble of forgetting to attach the caps in the packing box when the baby stroller is packaged can be solved. Nevertheless, such a structural design always results in elastic fatigue of the engaging members and makes them lose the function of engagement.

SUMMARY OF THE INVENTION

In view of this, the inventor of the present invention studied hard on a fixing device for wheel seats of a baby stroller, in order to fast assemble and disassemble the wheel seats, to avoid elastic fatigue which can result in inefficiency of the engaging members.

The primary object of the present invention is to provide a fixing device for wheel seats of a baby stroller, the fixing device has the effect of quick assembling and disassembling, so that a user can assemble the wheel seats by himself.

Another object of the present invention is to provide a fixing device for wheel seats of a baby stroller, such a device has an effect of fixing and stabilizing a wheel seat and thus is practical.

Another object of the present invention is to provide a fixing device for wheel seats of a baby stroller, the device can be mounted in advance onto feet of the baby stroller to avoid trouble of attaching engaging members.

The present invention will be apparent in the technique thereof after reading the detailed description of the preferred embodiment of the present invention in reference to the accompanying drawings.

DETAILED DESCRIPTION OF THE PREFERRED EMBODIMENT

Figure 1:
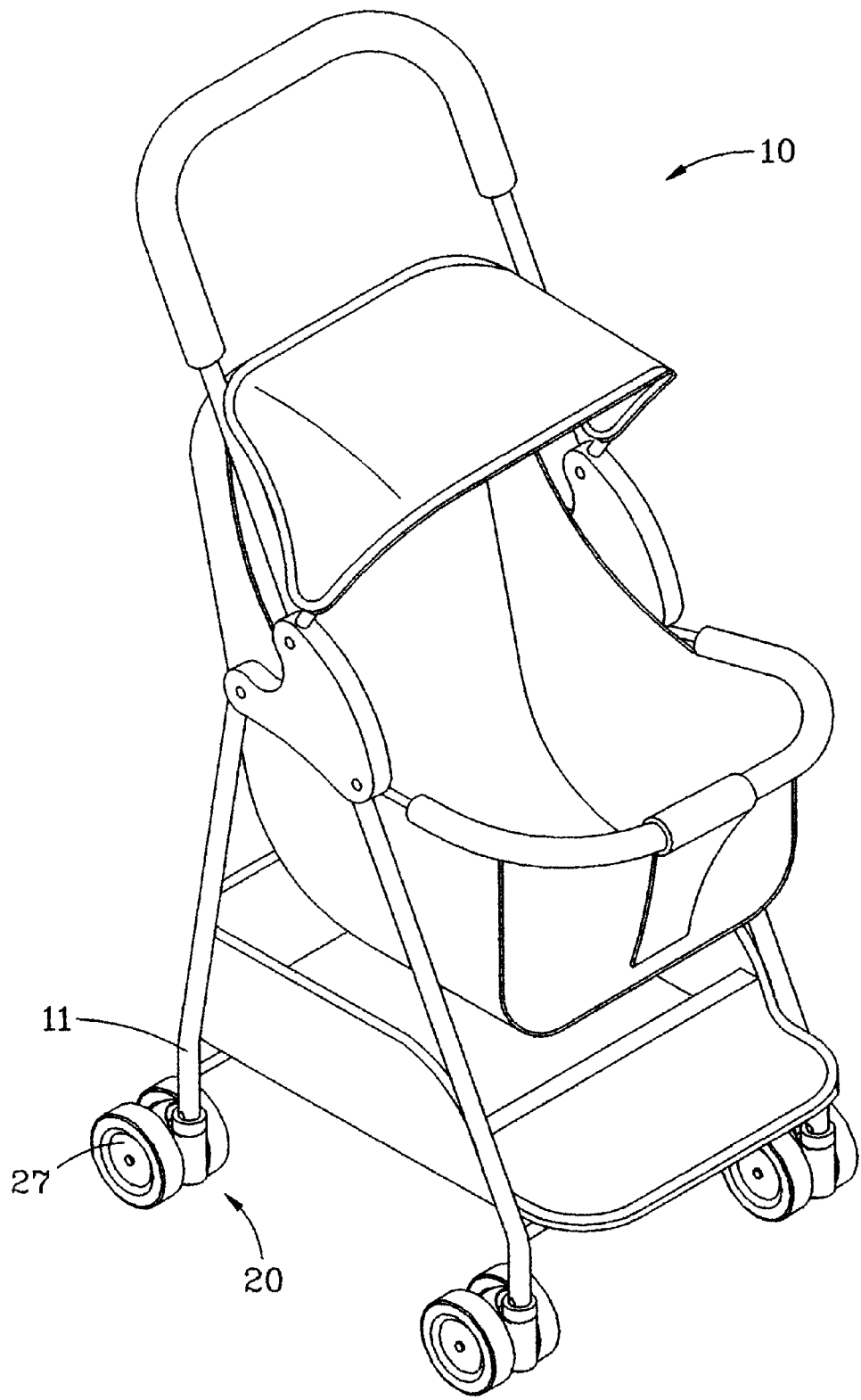
FIG. 1 is a perspective view showing an embodiment of a fixing device for a wheel seat of the present invention.
Figure 2:
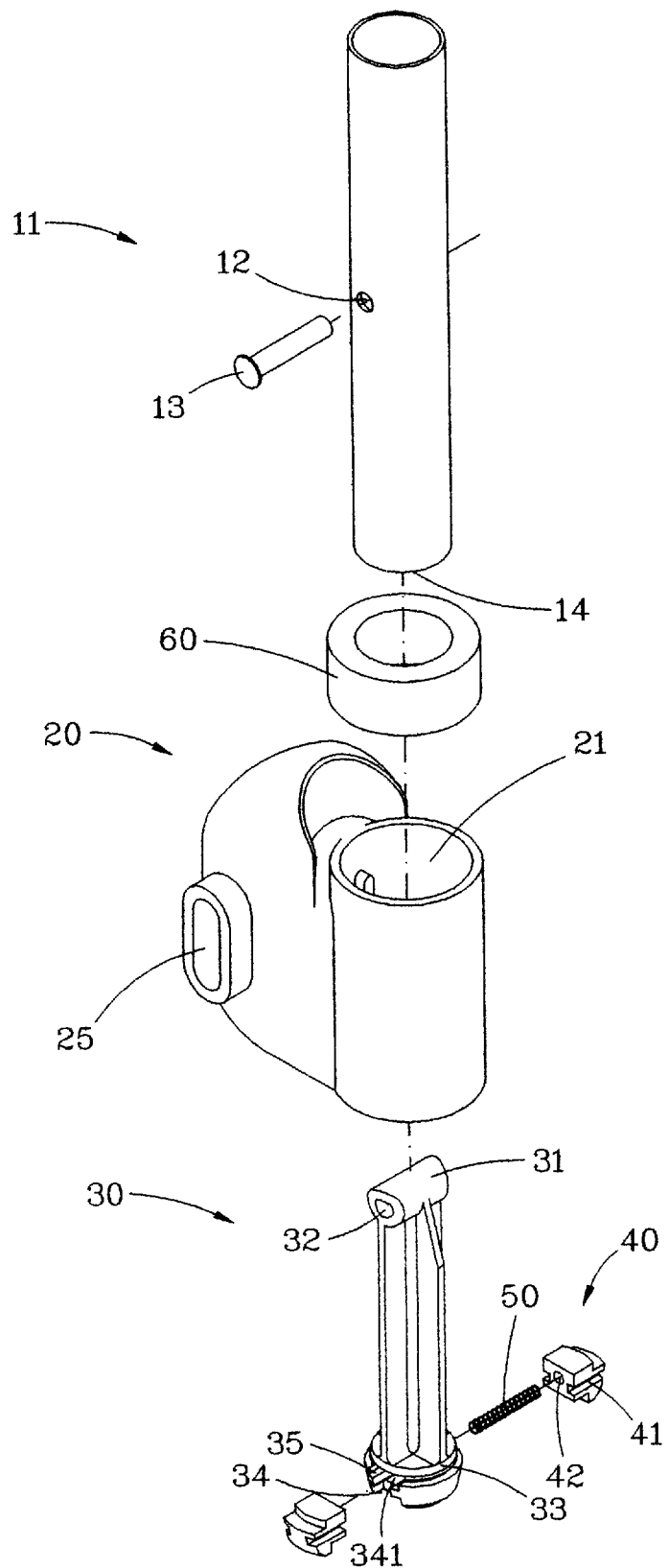
FIG. 2 is an analytic perspective view of the fixing device for the wheel seat of the present invention.

Referring firstly to FIG. 1 and 2 of the drawings, the fixing device for the wheel seat of the baby stroller of the present invention is provided on a foot 11 of the baby stroller 10. The device is used for effective fixing the wheel seats 20 onto the foot 11, and makes assembling as well as disassembling of the wheel seats 20 possible.

The fixing device is comprised of a fixing rod 30, more than one push buttons 40 and an elastic member 50 (as shown in FIG. 2).

The fixing rod 30 secured on the bottom of the foot 11 of the baby stroller 10 is provided on one end 31 thereof with a fixing hole 32. The foot 11 is provided with another fixing hole 12 opposite to the fixing hole 32 for fixing the fixing rod 30 in the foot 11 by extending a rivet 13 through the fixing holes 12 and 32. The other end 33 of the fixing rod 30 protrudes down and out from a pipe mouth 14 of the foot 11 and is provided at least with a transverse slot 34 which extends transversely through the fixing rod 30 in this embodiment. The transverse slot is provided therein on the two lateral walls thereof with two slide rails 35.

Two push buttons 40 are provided respectively in the transverse slots 34 of the fixing rod 30 and are displaceable transversely in the transverse slots 34. Both sides of each push button 40 are provided each with a slide way 41 for the purpose of smooth sliding of the two push buttons 40 in the transverse slots 34. The two push buttons 40 are further provided with receiving holes 42.

The elastic member 50 is received in one of the receiving holes 42 of The two push buttons 40. So that when the two push buttons 40 are mounted in the transverse slots 34 of the fixing rod 30, the two push buttons 40 can be pushed with elastic restoring function.

The transverse slot 34 of the fixing rod 30 is further provided on the upper portion thereof with a notch 341. In this way, the push buttons 40 can abut against the inner wall of the foot 11 to prevent themselves from dropping.

The foot 11 with the fixing device thereon is extended in an axle hole 21 of the wheel seat 20. By means of a sleeve 60 provided between the wheel seat 20 and the rivet 13, the wheel seat 20 can be fixed on the foot 11.

Figure 3:
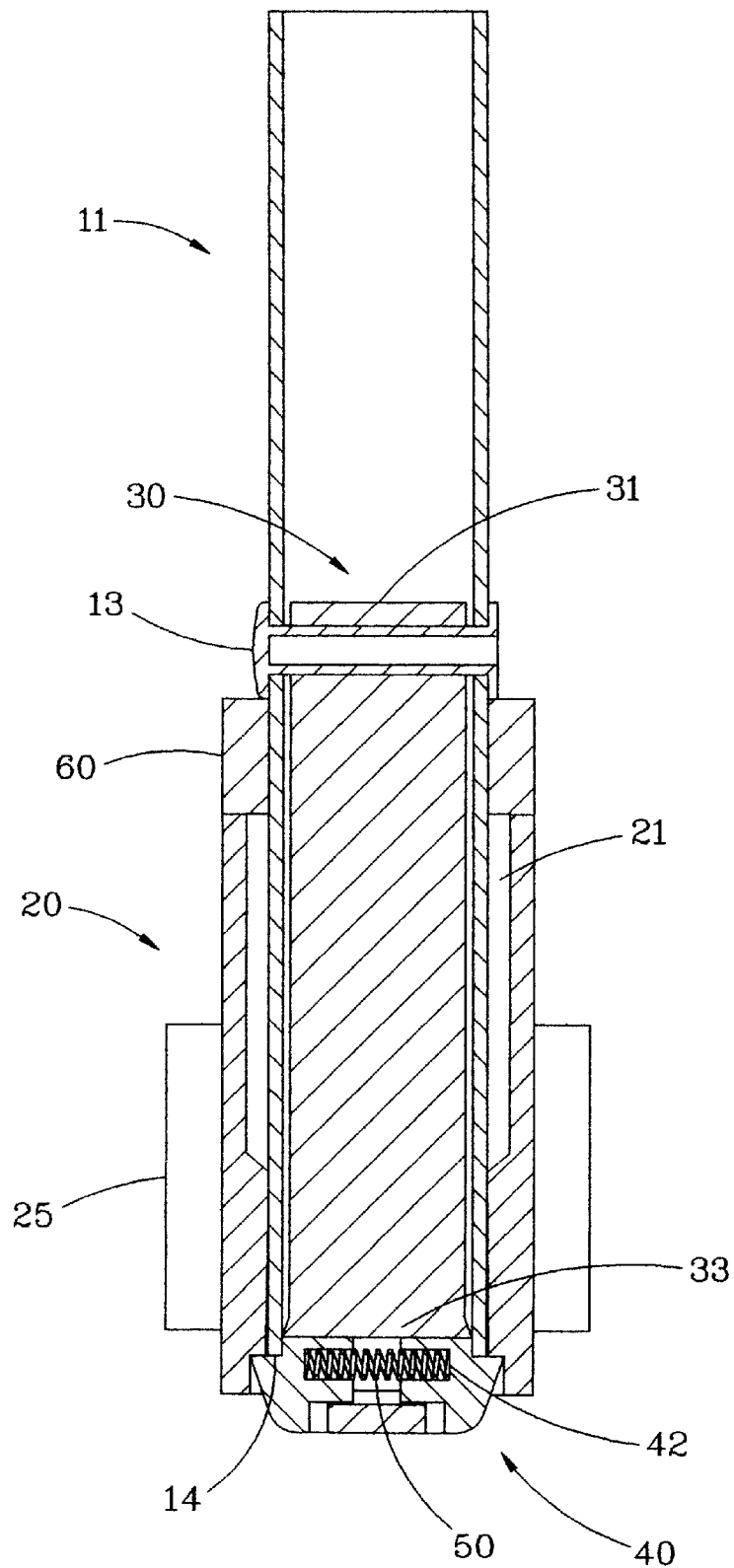
FIG. 3 is a sectional view showing assembling of the fixing device for the wheel seat of the present invention.

Referring to FIG. 3 which is a sectional view showing assembling of the fixing device of FIG. 2, wherein, the push buttons 40 and the elastic member 50 received in the receiving holes 42 of the two push buttons 40 are assembled with one another. Then the fixing rod 30 is inserted in the foot 11 of the baby stroller 10, and is fixed on the foot 11 by extending the rivet 13 through the fixing hole 12 on the foot 11 and the fixing hole 32 on the fixing rod 30. Now the push buttons 40 are pushed outwardly by the elastic member 50 to render the upper portions thereof located in the notches 341 of the fixing rod 30 to abut against the inner wall of the foot 11 to prevent the push buttons 40 from dropping.

Thereafter, the sleeve 60 is slipped over the foot 11, and then the foot 11 is extended through the axle hole 21 of the wheel seat 20. At this time, the push buttons 40 mounted on the bottom of the fixing rod 30 are pushed inwardly to have the foot 11 extended into the axle hole 21. In this way, when the foot 11 is completely extended through the axle hole 21, the push buttons 40 are appropriately pushed outwardly by the elastic member 50. To thereby render the lower portions of the push buttons 40 to abut against the inner wall of the lower portion of the wheel seat and to thereby fix the foot 11 on the wheel seat 20.

Figure 4:
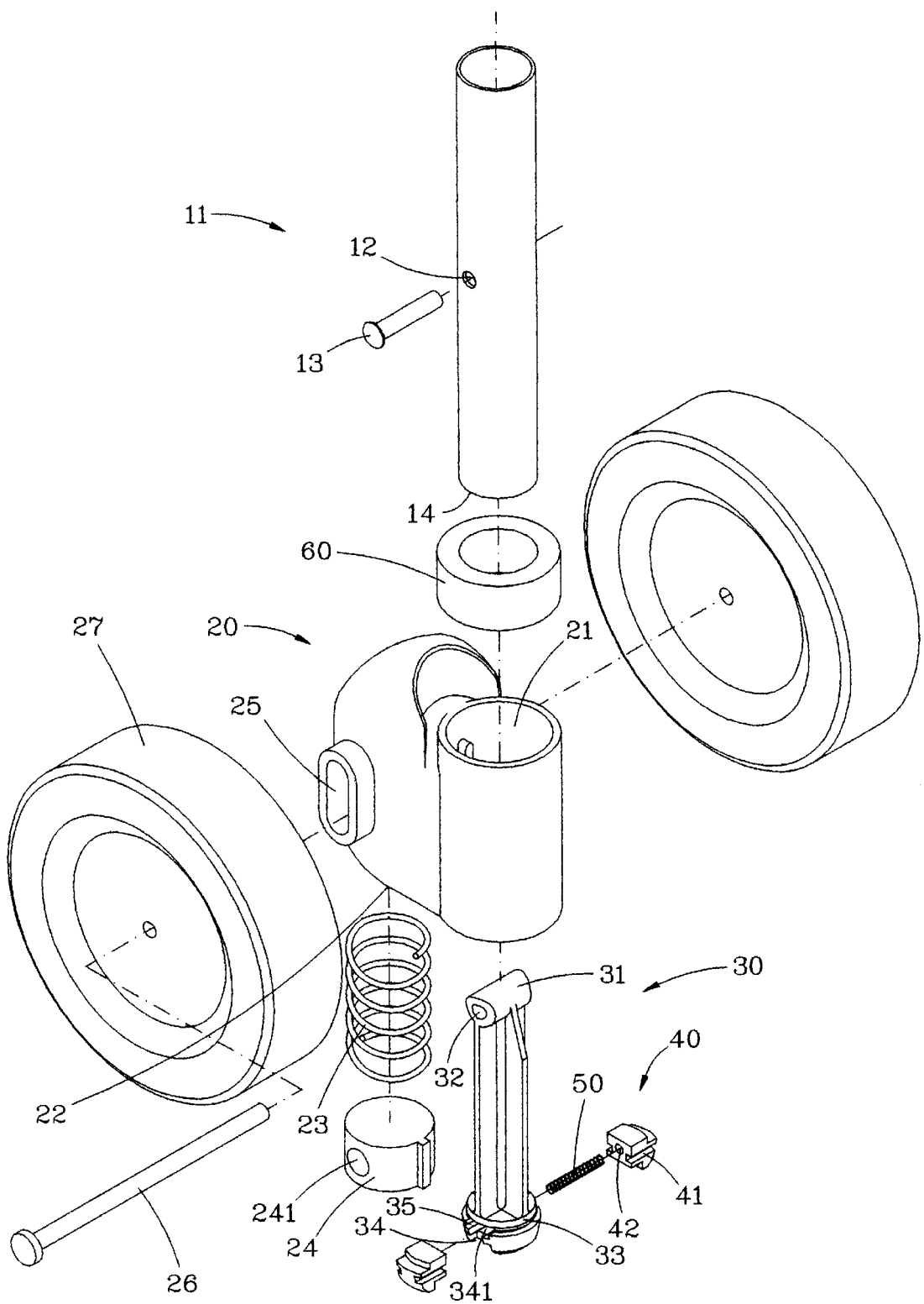
FIG. 4 is a schematic analytic perspective view of the fixing device for the wheel seat to be assembled with wheels of the present invention.

Referring to FIG. 4, the wheel seat 20 is provided by the axle hole 21 with a receiving chamber 22 in which an elastic member 23 and a movable block 24 are provided. The movable block 24 is provided with a fixing hole 241. While the receiving chamber 22 of the wheel seat 20 is provided on both sides thereof with a vertical ear canal 25. Then an axle rod 26 is extended through the vertical ear canals 25 and the fixing hole 241 of the movable block 24, thus two wheels 27 can be mounted respectively on the two ends of the axle rod 26. By this means, the two wheels 27 can get buffering effect on the wheel seat 20.

Figure 5:
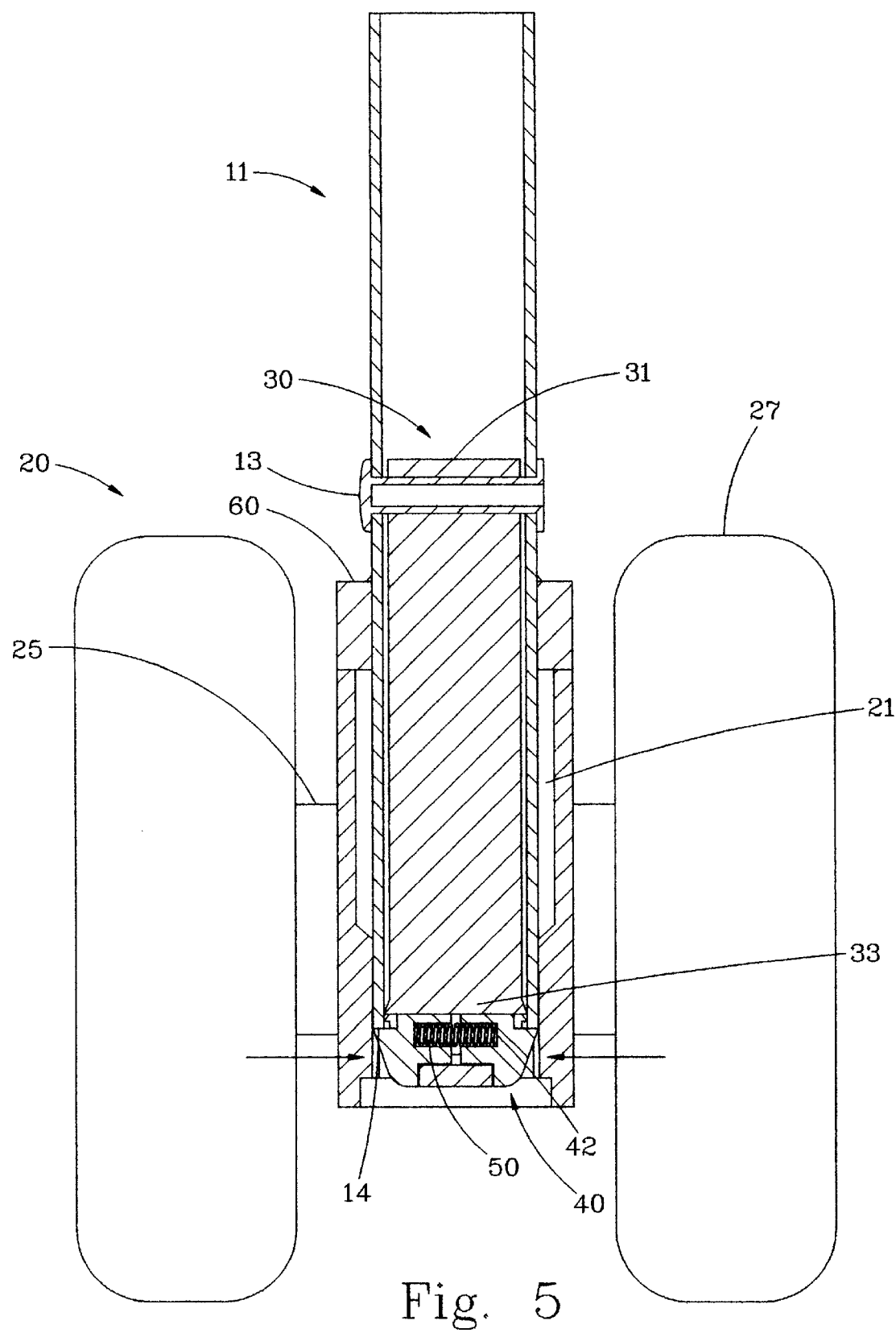
FIG. 5 is a schematic sectional view showing operation of the fixing device for the wheel seat of the present invention.

Referring to FIG. 5, when the wheel seat 20 is to he taken off the foot 11 of the baby stroller, the push buttons 40 are firstly pressed into the transverse slots 34 of the fixing rod 30 to make the push buttons 40 disengaged from the wheel seat 20. And therefore, the wheel seat 20 can be removed from the foot 11. Therefore, when a manufacturer finishes production of the baby stroller, there is no necessity of providing wheel seats 20 on the feet 11 thereof. The wheel seats 20 can be left for consumers to assemble by themselves. In this way, volume of the baby stroller to be packaged can be reduced, and cost of shipping can be lowered.

By the above stated structural combination, the fixing device for the wheel seats of the baby stroller of the present invention can surely obtain the object of present invention mentioned above. That is, it is convenient in detaching and assembling wheels, thereby volume of the baby stroller to be packaged can be reduced, and the wheel seats can be effectively engaged and fixed.

The present invention is therefore industrial valuable and is improved and novel, what I claim as new and desire to be secured by Letters Patent of the United States are:

1. A fixing device for wheel seats of a baby stroller comprising:

a fixing rod to secure said fixing device to a lower end of a foot of said stroller, said fixing rod has a first end protruding from a pipe mouth of said foot, said first end is provided with a transverse slot, said transverse slot of said fixing rod is provided therein with a plurality of slide rails;

a pair of push buttons, a first push button and a second push button provided at respective ends of said transverse slot of said fixing rod, said push buttons being displaceable transversely in said transverse slot, each said push button includes a slide way on each of two opposing sides of each said push button, said slide ways receive said slide rails of said transverse slot of said fixing rod; and an elastic member positioned between said first push button and said second push button, said elastic member provides a restoring force when one of said push buttons is pushed inward into said transverse slot; such that said fixing device is provided on each of a plurality of feet of said baby stroller for engaging and fixing in place a respective one of said wheel seats, each said wheel seat being provided with an axle hole to receive a respective one of said feet, said wheel seat being rotatable relative to said respective one of said feet, such that when one of said feet with one fixing device thereon is extended into said axle hole of said wheel seat, said first and second push buttons are pushed inward by an inner wall in said axle hole of said wheel seat so that said one of said feet is received in said axle hole, said push buttons then being pushed outward by said elastic member in order to secure said wheel seat in position.

* * * * *